United States Patent [19]

Robinson et al.

[11] 4,376,623
[45] Mar. 15, 1983

[54] EXTRUDER WITH TEMPERATURE CONTROL

[75] Inventors: James E. Robinson, Johnston, R.I.; Eric I. Siwko, Marlboro, Mass.

[73] Assignee: The Entwistle Company, Hudson, Mass.

[21] Appl. No.: 309,460

[22] Filed: Oct. 8, 1981

[51] Int. Cl.³ .............................................. B29B 1/06
[52] U.S. Cl. .................................. 425/143; 264/40.1; 264/40.6; 425/144; 425/160
[58] Field of Search ....................... 425/143, 144, 160; 264/40.1, 40.6

[56] References Cited

U.S. PATENT DOCUMENTS 3,751,014 8/1973 Waterloo ........................... 264/40.6
3,866,669 2/1975 Gardiner ............................ 425/143

Primary Examiner—Maurice J. Welsh
Attorney, Agent, or Firm—Barlow & Barlow Ltd.

[57] ABSTRACT

A plastic material extruder having a barrel and an outer sheath with heating and cooling means in the outer sheath is disclosed, together with means for maintaining the temperature of the inner barrel, including two temperature sensing devices, one on the barrel and one on the other sheath, the sensing devices connected to control circuitry which actuates the heating and cooling means to maintain a temperature gradient between the two sensors by sensing the temperature change from the barrel and adjusting the set point of the sensing device on the sheath.

2 Claims, 1 Drawing Figure

U.S. Patent      Mar. 15, 1983      4,376,623
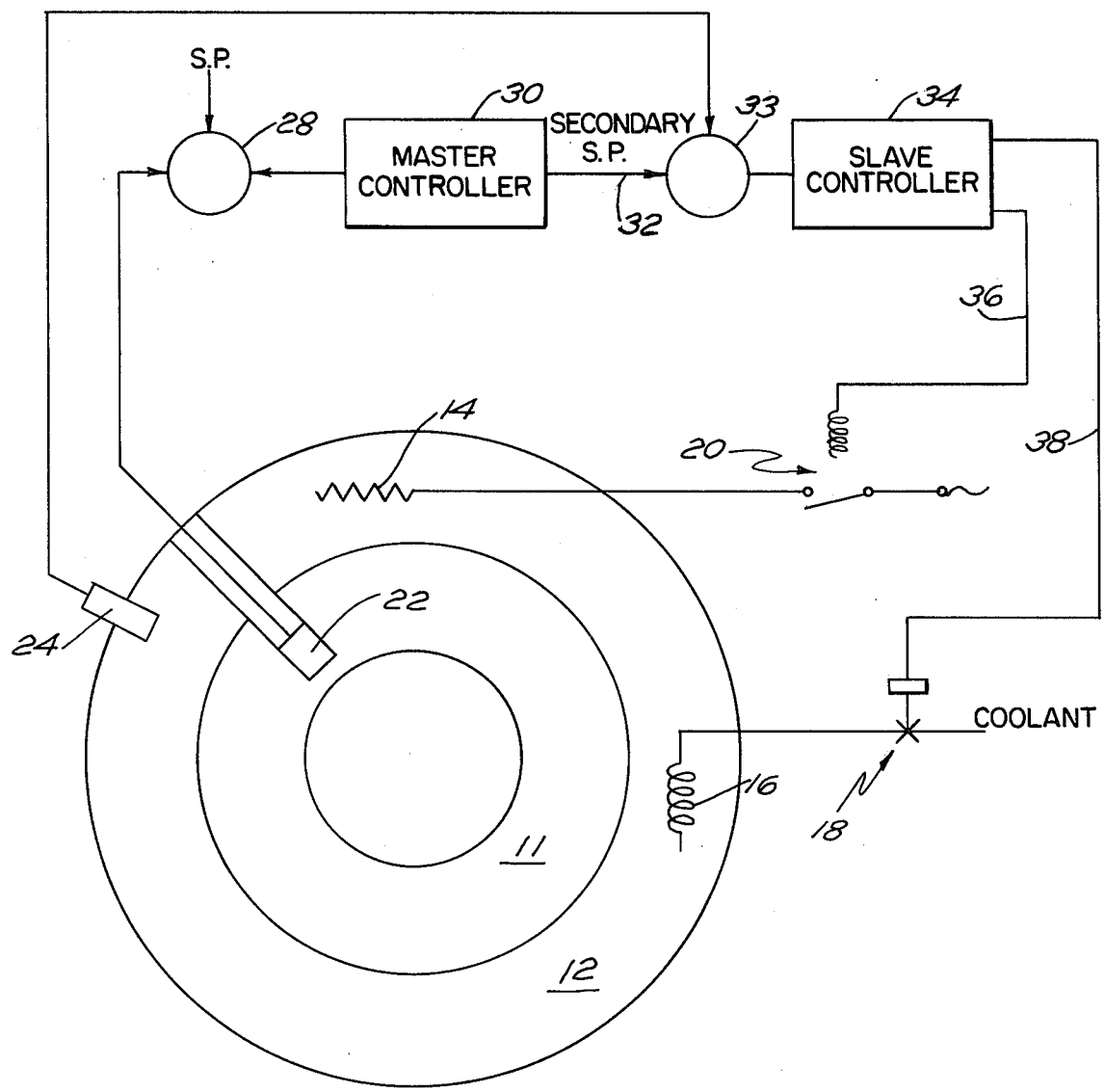

EXTRUDER WITH TEMPERATURE CONTROL

BACKGROUND OF THE INVENTION

This invention relates to a plastic material extruder and more particularly an apparatus for controlling the temperature of the inner barrel of the extruder as related to the temperature of the outer sheath in which heating and cooling means are contained.

In order to produce uniform products from an extruder, it is advantageous when processing plastic material that the barrel be kept at a constant temperature. Changes in the barrel temperature change the pastic material and particularly its viscosity which can cause uneven flow. It is also known that the barrel and the sheath which contains the heating and cooling devices, act as heat sinks; thus as the temperature of barrel and in turn the plastic resin material fluctuates, the flow varies. There is a time lag in prior devices which occurs so that the barrel may be either too hot or too cool. Basically, barrel temperatures can swing over a relatively large range, and in the prior art devices, the temperature control devices have had a very slow response to reduce temperature excursions. This is unsatisfactory with many plastic resin materials.

The problem has been previously recognized and dealt with as, for example, in U.S. Pat. No. 3,751,014 where a pair of temperature probes are used, one in the barrel and one in the sheath, and the two temperatures sensed are averaged. That is, the control is sensitive to T-1 plus T-2 divided by two. A similar approach is seen in U.S. Pat. No. 3,866,669.

It is therefore an object of the instant invention to provide an improved method and apparatus for controlling the temperature of the plastic to within a narrow band by sensing the temperature of the inner barrel and the other sheath by readjusting the set point of the outer surface from the actual outer surface temperature by a deviation of error of the inner barrel from its set point.

SUMMARY OF THE INVENTION

The invention discloses a method and apparatus for controlling the temperature of plastic material about a predetermined point by sensing the barrel temperature in the outer sheath independently. Deviation of error of the temperature of the barrel from set point creates an output which output can be varied through a primary controller. The output of the controller effectively produces an offset of the temperature being sensed at the outer sheath and this then goes to a secondary controller, which determines an output that either adds or removes heat from the surface of the sheath. This system has several advantages for, effectively, the barrel temperature set point is adjusted and the controller can issue commands which would be obeyed by the sheath control and thus, for any disturbances, correction will be fast before temperature can show any effects. Furthermore, with this type of control, the control is totally independent of the material of the sheath and the material of the barrel and/or their relative thicknesses.

BRIEF DESCRIPTION OF THE DRAWING

The single FIGURE is a diagramatic illustration of the device of our invention.

DESCRIPTION OF THE PREFERRED EMBODIMENT

Referring now to the drawings, there is shown therein in simplified form a diagramatic view of an extruder barrel indicated by the reference numeral 11, which barrel is enclosed by a sheath 12. Sheath 12 contains a heating means diagramed as a resistance 14 and a cooling means diagramed as a cooling tube 15. The manner in which the heating device and the cooling tube are disposed in the sheath are relatively unimportant to this invention. It should be understood that the resistance and tube are not necessarily located within the sheath, but are purely exemplary of the fact that heating and cooling devices are used in or on the sheath. The electrical heating element 14 can be arranged in a variety of fashions within the outer sheath; and the cooling, which is diagramed at 16, can be a tube through which a coolant fluid flows, or an external blower. Coolant is controlled by a valve or switch generally designated 18 and similarly, the electricity to the heating element 14 can be controlled by a relay generally designated 20.

The temperature sensing consists of a master thermal sensing device 22 that is placed in thermal contact on the inner barrel and a slave thermal sensing device 24 which is in thermal contact on the sheath. The sensing devices can take a variety of forms and essentially provide an electrical change that is proportionate to the temperature that is sensed by the probe.

The control for adjusting the temperature of the extruder is essentially a system in which the unit has a master controller and a slave controller. Input from the inner barrel sensing device 22 is fed to a master controller 30 via a set point adjustment device in the form of an adder 28 so that the input to the master controller 30 is effectively the deviation of the temperature from a preset point. The output of the master controller can essentially be considered a secondary set point so that the input to the slave controller 34 from adder 33 is essentially a deviation from the temperature sensed by the sensing device 24 and the secondary set point output from the master controller, which is indicated generally by the line 32. The output of the slave controller 34 has one lead 36 for controlling or actuating the relay 20 and a second lead 38 for controlling or actuating the valve 18.

It will be appreciated that with this system, the disturbance whose effect on the temperature will be best controlled is the one which affects the secondary variable and it is for this reason that the sheath temperature is utilized to modify the output of the master controller. This system gives fastest correction without waiting for any temperature change to occur since the disturbing conditions depend on the actual specific temperature of the barrel. This means that the final control element 34 is readjusted before any disturbances can seriously affect the temperature.

For the full benefits of a system of this nature the hardware must be designed for the correct ranges; for example, not only must the master controller cover all values over which control is desired, but the slave controller must include all the set points needed to make the primary variable line out at any value desired. Properly designed, the instant arrangement improves the control of a slow-changing, slow-responding variable by correcting disturbances before they produce serious effects. It is only necessary to dial up a set point and the apparatus is a self-correcting, continuous monitoring device that reduces peak deviation from disturbances.

We claim:

1. A plastic extruder having an inner barrel and an outer sheath thereabout, heating means for said sheath, cooling means for said sheath, means thermally controlling the temperature of the inner barrel comprising a master thermal sensing device on said barrel, a slave thermal sensing device on said sleeve, control circuitry connected to both sensing devices to selectively actuate the heating means and the cooling means to maintain a temperature gradient between the two sensors, said circuitry sensing the temperature change from the master sensing device and readjusting the set point of the slave device.

2. A plastic extruder as in claim 1 wherein the master sensing device output is altered by a set point adjustment to produce a secondary set point that alters the output of the slave sensing device.

* * * * *